Feb. 3, 1948.  J. F. CREWS  2,435,424
REGENERATIVE HEATING DEVICE
Filed April 12, 1946  2 Sheets-Sheet 1

Inventor
JOHN F. CREWS

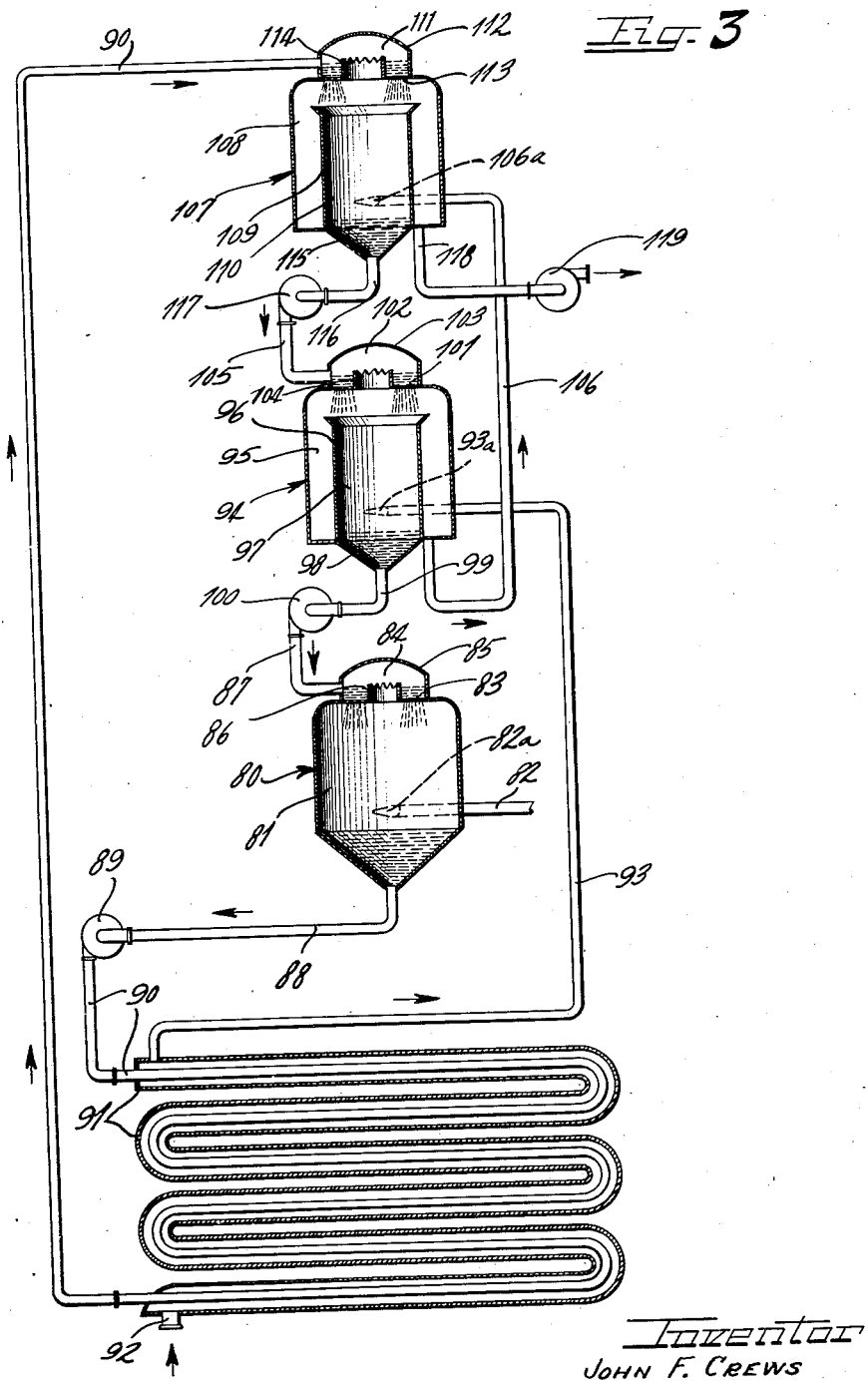

Patented Feb. 3, 1948

2,435,424

UNITED STATES PATENT OFFICE 2,435,424

REGENERATIVE HEATING DEVICE

John F. Crews, Appleton, Wis., assignor to Western Condensing Company, San Francisco, Calif., a corporation of California Application April 12, 1946, Serial No. 661,515

2 Claims. (Cl. 159—18)

This invention relates to methods and apparatus for efficiently heating liquids and deals specifically with the high temperature sterilization of heat-sensitive or heat-decomposable liquids such as lactose-containing liquids without scorching or decomposing the liquids.

High temperature heating or sterilization of heat-sensitive liquids, such as whey, is not readily accomplished with contact heaters or customary heat exchangers because the heating media can never be materially above the desired sterilization temperature, due to danger of scorching or decomposing valuable ingredients in the liquid. Under these conditions, customary heaters or heat exchangers do not have appreciable capacity, and exceptionally large equipment of this nature is necessary for handling appreciable volumes of such liquids. In order to obtain good heat transfer from the heating media which is only a few degrees higher than the temperature desired for the liquid being heated, extensive heat transfer surfaces are required. Such equipment is large and bulky, contains excessive amounts of metal for heat transfer effect, and, at best, has a limited capacity.

According to the present invention, relatively small, compact, regenerative heating units are provided for handling large volumes of liquids to efficiently heat these liquids to relatively high temperatures without utilizing a heating media that is appreciably hotter than the liquid which it heats.

According to this invention, the liquid is heated in stages under progressively decreasing degrees of vacuum or increasing pressure. Heated liquid from a preceding higher pressure stage is flashed back to a lower temperature and lower pressure stage for heating liquid entering this stage. The liquid is heated to a much higher temperature, and utilization of the heat absorbed from the heated liquid to heat the incoming liquid makes the units of this invention very efficient.

In some forms of the invention the heating media, such as live steam, is directly introduced into the liquid being heated. In other systems according to this invention, the heating media is not commingled with the liquid being heated, but is only placed in heat exchange relation therewith.

Therefore it is an object of this invention to provide a multi-stage regenerative heating device or evaporator wherein liquid to be heat treated is heated in stages to the desired temperature, and wherein heat from the heated liquid is absorbed in stages for heating the liquid in preceding stages.

A further object of this invention is to provide a regenerative heating device wherein the temperature of a liquid is increased in stages under increasing absolute pressures and wherein the temperature in the stages, with the exception of the last stage, is maintained by heated liquid from the next succeeding stage.

A further object of the invention is to provide a regenerative heater wherein liquid to be heat treated is sprayed into a first stage maintained under low pressure and heated by liquid from a succeeding stage maintained under higher pressure, and wherein the heated liquid from the first stage is pumped into the succeeding stages after being heated in each succeeding stage.

A still further object of the invention is to provide a regenerative heating device wherein live steam is introduced into a final chamber into which preheated liquid from previous chambers is sprayed for heating the preheated liquid to the final desired temperature, and wherein liquid from each succeeding stage is flashed back to a preceding stage for heating liquid sprayed therein.

A further object of this invention is to provide a method for heating heat-sensitive or heat-decomposable liquids such as lactose-containing liquids including whey, milk, and the like, without ever subjecting said liquids to a scorching temperature, by commingling the liquid in succeeding stages under increasing pressures with heated liquid from succeeding stages that is flashed back to the preceding stages at lower pressures.

A still further object of this invention is to provide a method of heating heat-sensitive liquids with heating fluids that are never materially hotter than the liquids which they heat, and wherein these heating fluids are created, at least in part, from the heated liquid obtained in a succeeding stage.

Another object of this invention is to provide an efficient evaporator wherein condenser water from a last stage is utilized to preheat liquid to be treated and is then introduced into a preceding stage maintained at lower temperatures and heated by the product from a succeeding stage at higher pressures.

Another object of the invention is to provide a heating device which heats liquids in increments at increasing pressures with liquids previously heated in succeeding stages under increased pressures.

Other and further objects of the invention will be apparent to those skilled in the art from the following detailed description of the annexed sheets of drawings which, by way of preferred examples only, illustrate three embodiments of the invention.

On the drawings:

Figure 3 is a view similar to Figure 1 but illustrating an evaporator in accordance with this invention.

As shown on the drawings:

Figure 1:
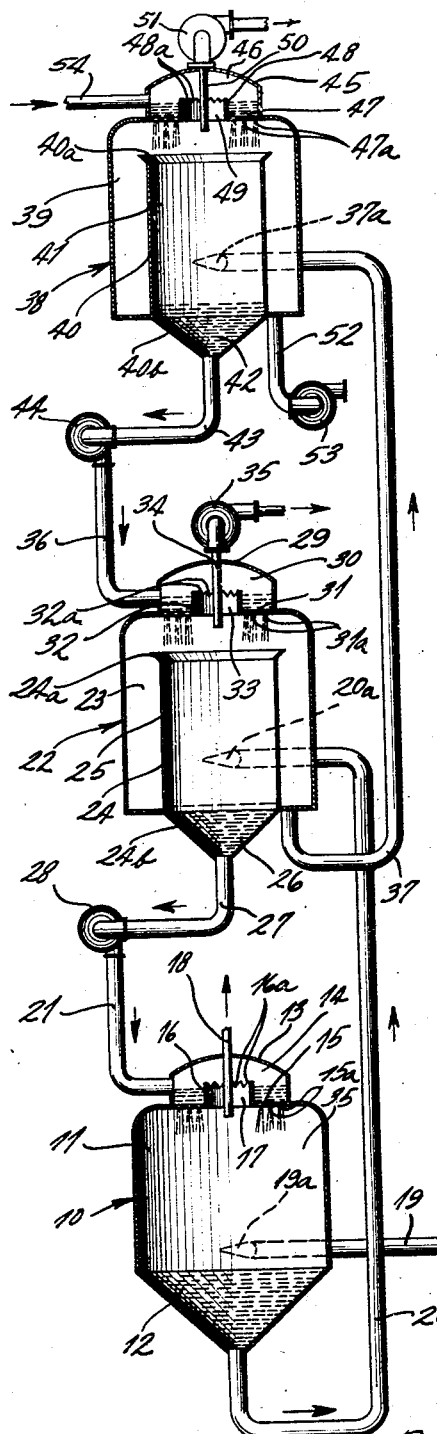
Figure 1 is a somewhat diagrammatic vertical cross-sectional view, with parts in elevation, of a three-stage regenerative contact-type heater according to this invention.

In Figure 1 the reference numeral 10 designates generally a tank providing the last effect for a regenerative heater according to this invention. The tank 10 defines an upstanding cylindrical chamber 11 with a hopper bottom 12. A cap 13 is provided on top of the tank 10 and defines a chamber 14 above the tank. A perforated plate 15 having perforations 15a therethrough separates the bottom of the chamber 14 from the top of the chamber 11. An upstanding neck 16 is provided on the plate 15 and projects into the space 14 to define a central passageway 17 connecting the space 14 with the chamber 11. The upper edge of the neck 16 is notched as at 16a to provide spillways or weirs for liquid in the chamber 14 rising to a level above the bottoms of the notches.

A vent pipe 18 extends through the cap or dome 13 and into the upper portion of the chamber 11.

Live steam is introduced from a feed pipe 19 through a tangential inlet 19a to the lower portion of the chamber 11.

A pipe line 20 is connected with the bottom of the hopper portion 12 of the tank 10. An inlet pipe 21 discharges into the chamber 14. Liquid introduced into the chamber 14 from the pipe 21 is sprayed into the chamber 11 through the apertures 15a of the plate 15 where it commingles with and is heated by steam introduced from the tangential inlet 19a. The heated liquid collects in the hopper bottom 12. Non-condensible materials, such as air or gases, are bled out of the chamber 11 through the vent pipe 18. The tank 10 is operated so as to be under superatmospheric pressure.

The heater of Figure 1 has a second effect or stage composed of a cylindrical tank 22 defining a chamber 23 therein and receiving through the bottom wall thereof an open-topped, hopper-bottomed container 24. The container 24 is secured to the bottom wall of the tank 22 and its side wall is spaced inwardly from the side wall of the tank to provide an annular space therearound in the tank. The insert container 24 has an outwardly flanged top lip 24a around the open top thereof in spaced relation under the top wall of the tank 22. The bottom of the container 24 projects beyond the bottom wall of the tank 22 and is inclined at 24b. The insert container defines in the tank 22 a cylindrical chamber 25 and a hopper bottom chamber 26 which drains through a pipe line 27 into a pump 28. The pump 28 discharges into the pipe line 21.

The top wall of the tank 22 receives a cap or head dome 29 thereon defining a space or chamber 30 above the chamber 23 and connected thereto through an apertured plate 31 having spray holes 31a therethrough. A neck member 32 is carried by the central portion of the apertured plate 31 and defines a central passageway connecting the chamber 30 with the chamber 23 above the inlet mouth 24a of the insert container 24. This neck 32 has V-shaped notches 32a around the upper edge thereof to provide weir gates or spillways into the passageway 33. A bleeder pipe 34 for non-condensible gases or the like extends through the top of the cap 29 and the neck 32 into the upper portion of the chamber 23. Since the second effect of the heater is maintained under vacuum, this vent pipe 34 is connected to the suction side of a pump 35 which discharges into the atmosphere.

Liquid is fed to the chamber 30 through a pipe 36 communicating with the chamber through a side wall of the cap 29.

The pipe line 20 from the tank 10 terminates in a tangential inlet 20a on the tank 22 to discharge into the annular space between the side wall of the tank and the side wall of the insert container 24 near the bottom of the tank. The heated liquid from the last effect provided by the tank 10 is flashed back into the second effect provided by the tank 22 to heat liquid sprayed into the second effect from the chamber 30 thereof. The interior of the chamber 23 of the tank 22 is maintained at a pressure less than that existing in the chamber 11 of the tank 10.

Liquid in the tank 23 around the insert container 24 thereof is drained through a pipe line 37, communicating with the bottom of the chamber 23 through the bottom of the tank 22.

The heater of Figure 1 has a first effect provided by a tank 38 arranged substantially identical with the tank 22 and defining a heating chamber 39 therein. An open-topped container 40 projects through the bottom wall of the tank 38 and defines a cylindrical chamber 41 in the chamber 39. The insert container 40 has an outturned upper lip or flange 40a around the inlet mouth thereof beneath the upper wall of the tank 38 and has an inclined bottom 40b projecting below the bottom wall of the tank 38. The inclined bottom 40b provides a hopper chamber 42 at the bottom of the chamber 41. This chamber 42 is drained by a pipeline 43 leading to the suction side of the pump 44 which discharges into the pipeline 36.

The top wall of the tank 38 receives a cap or head dome 45 thereon providing a chamber 46 above the chamber 39 and connected therewith through an apertured plate 47 having spray holes or apertures 47a therethrough above the top of the insert container 40 in the tank 38. A neck member 48 extends from the central portion of the plate 47 into the chamber 46 and has notches 48a around the upper edge thereof providing weir gates or spillways to a passageway 49 through the neck member discharging into the top of the insert container 40. A vent pipe 50 for non-condensibles such as gases or the like extends through the dome member 45 and neck 48 into the upper portion of the chamber 39. Since the first effect is maintained under vacuum, the vent pipe 50 is connected to the suction side of an exhaust pump 51.

The pipe line 37 from the second effect provided by the tank 22 discharges through a tangential inlet 37a into the chamber 39 around the insert container 40 at a level near the bottom of the tank 38. The bottom of this chamber is drained through a pipe line 52 extending to the suction side of an exhaust pump 53 which discharges into a storage tank (not shown).

Liquid to be heated is introduced into the chamber 46 through a feed pipe 54 extending into the side wall of the head cap 45.

The heater of Figure 1 is a three-stage regenerative heating device or sterilizer receiving liquid into the first effect or stage through the feed line 54. For example, liquid whey at about 50° is introduced into the chamber 46 to form a pool therein from which it is sprayed through the spray holes 47a into the chamber 39. This chamber 39 is maintained at an absolute pressure of about 2.6 inches of mercury by the exhaust pump 53, and is heated by liquid flashed through the inlet 37a from the second stage or effect of the device. The liquid sprayed into the tank 38 is heated to approximately 100° F. and falls into the insert container 40 from which it is pumped by the pump 44 into the chamber 30 of the second effect provided by the tank 22. Liquid from the chamber 30 is sprayed through the spray holes 31a into an atmosphere of steam at an absolute pressure of about 9.6 inches of mercury. The second stage or effect is heated by liquid flashed from the last stage through the tangential inlet 29a and the liquid in the container 24 is heated to a temperature of about 150° F. It is then pumped into the chamber 14 of the last effect provided by the tank 10, and is sprayed into the chamber 11 through the spray holes 15a where it commingles with steam introduced through the tangential inlet 19a and is heated by the steam to about 210° F. at an absolute pressure of about 35 inches of mercury.

The liquid at 210° F., and at an absolute pressure of about 35 inches of mercury is heated sufficiently to be sterile and is then flashed back into the chamber 23 of the second effect provided by the tank 22 due to the pressure differential between the chambers 11 and 23. The 210° liquid flashes down to an absolute pressure of 9.6 inches of mercury, which is equal to a boiling point of 160° F. In dropping from 210° to 160° F., the liquid relieves sufficient water vapor or steam to heat the incoming liquid at 100° from the first effect to a temperature of 150°. The 160° liquid flashed into the chamber 23 then proceeds to the first effect, where it flashes down to 110° at the same time relieving sufficient water vapor or steam to heat the incoming liquid to 100° F.

It will be obvious from the above description that the feed liquid or whey is heated from 50° to 210° F. and back to 110° F. with only sufficient external steam being added to heat the liquid from 150° to 210° F. The ratio of total temperature rise brought about by outside steam is, therefore, 2.66. The efficiency of the device, which is the ratio of the temperature rise in the liquid, divided by the temperature rise in the last effect or stage brought about by the introduced steam, and again divided by the number of stages, is 89%.

It should be understood that more than three stages can be used for the heating device of Figure 1, and the unit becomes more efficient as the required temperature rise in each stage is decreased. Thus, if six stages were used, the temperature rise in each succeeding stage would only be half of that required in the device of Figure 1, having three stages. The device would, therefore, be more efficient.

Figure 2:
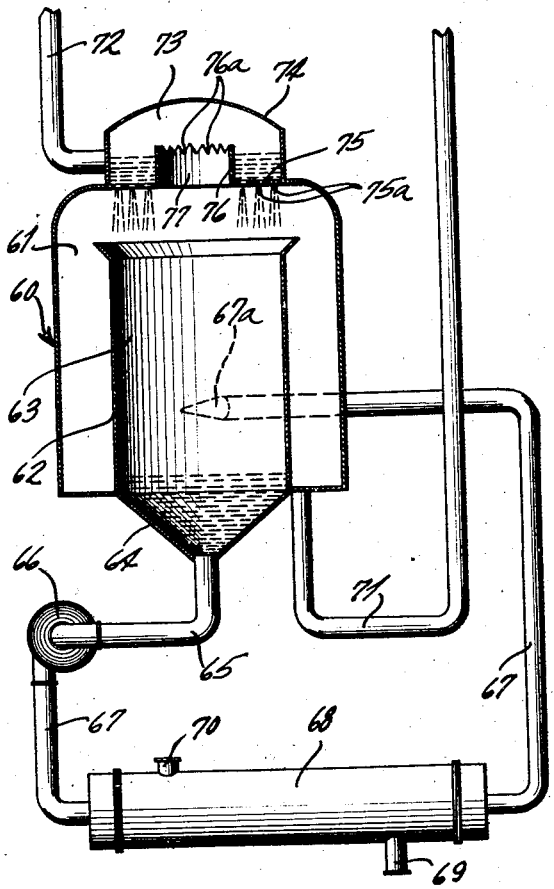
Figure 2 is a partial view similar to Figure 1 but illustrating a modified arrangement for the last effect or heating stage of the device shown in Figure 1.

In the modification shown in Figure 2, the last effect or stage provided by a tank 60 is used in place of the last stage or effect provided by the tank 10 in the device of Figure 1. This tank 60 defines a chamber 61 therein and receives an insert container 62 providing a chamber 63 within the chamber 61. This chamber 63 discharges through a hopper bottom 64 into a drain pipe 65 leading to the suction side of a pump 66. The pump 66 discharges through a pipe line 67 which passes through a heat exchanger 68 supplied with steam through an inlet 69 and having the condensate water removed through an outlet 70. The liquid in the pipe 67 is heated in the heater 68 to temperatures sufficient for maintaining a temperature of about 210° in the chamber 61. The pipe 67 discharges the heated liquid through a tangential inlet 67a into the chamber 61 around the chamber 63. Liquid from this chamber 61 is discharged through the pipe line 71 to the preceding stage (not shown) for the device. Liquid from this preceding stage is fed through a pipe 72 into the chamber 73 provided by the cap or head dome 74 on top of the tank 60 and is sprayed into the chamber 61 to drop into the chamber 63 through spray holes 75a of a perforated plate 75 which separates the chambers 73 and 61. As described previously a neck member 76 is provided on the central portion of the plate 75 to project into the top chamber 73 to a desired height and has a notched top edge 76a to define spillways or weir gates from the chamber 73 into a passageway 77 into the chamber 63 in the event that liquid introduced into the chamber 73 rises to a level above the bottoms of the notches.

In the modification of Figure 2, the last effect or stage provided by the tank 10 in Figure 1 is replaced with the tank arrangement 60 shown in Figure 2. In this embodiment no outside steam is introduced into the system since the heater 68 supplies the heat to liquid drained from the chamber 64 and heats this liquid to the desired temperature. As a result, the liquid being sterilized or heat-treated is not diluted with outside steam. No increase in quantity of liquid is obtained. The device equipped with the last effect shown in Figure 2 and with two preceding effects as shown in Figure 1 has a heat ratio equal to 3.5 and an efficiency equal to 87.5%.

In the embodiment of the invention shown in Figure 3, there is provided a multiple effect flash evaporator operating on the same principle as the regenerative heaters described in connection with Figures 1 and 2. In the embodiment of Figure 3 liquid introduced into the first stage or effect is actually condenser liquid from the last stage or effect, and the product is introduced into the middle effect or stage after being heated with the condenser liquid from the last stage or effect.

As shown in Figure 3, the last effect or stage is provided by a tank 80 defining a chamber 81 with a hopper bottom and receiving heating steam from a pipe 82 having a tangential inlet 82a discharging into the chamber 81 just above the hopper bottom thereof. Liquid to be heated is sprayed into the top of the chamber 81 through a perforated plate 83 on the top of the tank 80 from a chamber 84 provided by a head cap or dome 85 mounted on the tank 80. A central overflow passageway provided by a neck member 86 joins the chamber 84 above the plate 83 with the chamber 81. Liquid is introduced into the chamber 84 from a pipe line 87 extending into the side wall of the head cap 85.

The condensate liquid from the bottom of the chamber 81 drains through a pipe line 88 and is pumped by a pump 89 into a pipe line 90 extending into a heat exchanger 91. The product to be evaporated is introduced into the bottom of the heat exchanger where it flows in countercurrent relation to liquid flowing through the pipe 90 around the pipe 90 to be discharged from the upper end of the heat exchanger 91 into a pipe line 93 which, in turn, discharges through a tangential inlet 93a into the second stage or effect of the unit provided by a tank 94. The tank 94 defines a heating chamber 95 receiving therein an open-topped container 96 defining a chamber 97 into the central portion of the chamber 95. The insert container 96 has a hopper bottom 98 discharging through a pipe 99 into a pump 100 which feeds the pipe line 87.

Liquid is sprayed into the second effect through a perforated plate 101 in the top of the tank 94 from a chamber 102 provided by a head dome or cap 103 on top of the tank 94. A central passage is provided by a neck member 104 on the plate 101 to permit the liquid from the chamber 102 to spill over the top of the neck through the notched top edge thereof in the event that its level rises above the bottom of the notches. The liquid from the passageway in the neck member 104 and from the spray holes in the perforated plate 101 falls into the chamber 97 and is heated by steam flashed from the liquid introduced through the tangential inlet member 93a into the chamber 95. The liquid fed into the chamber 102 is supplied by a pipe 105. Condensate from the steam flashed into the chamber 95 is flashed back through a pipe line 106 and is discharged through a tangential inlet 106a into the first effect or stage of the device provided by a tank 107. This tank 107, like the tank 94, provides a heating chamber 108 and receives an insert open-topped container 109 defining a liquid chamber 110 into the heating chamber 108. Liquid is sprayed into the top of this tank 107 from a chamber 111 provided by a cap or head dome 112 on the top of the tank through a perforated plate 113 and falls into the chamber 110. A central overflow passageway is provided by a neck member 114 on the perforated plate 113. Liquid is introduced into the chamber 111 from the pipe line 90 leading from the heat exchanger 91.

The chamber 110 has a hopper bottom 115 draining through a pipe line 116 into a pump 117 which discharges into the pipe line 105.

Evaporated liquid is drained from the bottom of the chamber 108 through a pipe line 118 exhausted by a pump 119.

In operation of the device of Figure 3, liquid is fed to the top chamber 111 where it falls in a spray into an atmosphere of steam at a subatmospheric pressure of about 1.3 lbs./square inch absolute. The liquid is heated to approximately 100° F. and is then pumped from the chamber 110 into the second effect or stage of the device where it is sprayed into an atmosphere of steam at 3.7 lbs./square inch absolute. In this second effect, the liquid is heated to about 140° and is discharged by the pump 100 into the chamber 84 of the last effect, from which it is sprayed into an atmosphere of steam at 14.123 lbs./square inch absolute where it is heated by the steam from the tangential inlet 82a to 200° F. This liquid at 200° F. and at an absolute pressure of about 14.123 lbs./square inch, is passed through the surface counterflow heat exchanger 91 where it heats up the product to be evaporated and at the same time has the heat absorbed therefrom to reduce its temperature to about 60° F. The product discharging from the counterflow heat exchanger 91 is heated to about 190° F. and is flashed into the second effect of the device where a second portion of it is evaporated and where its temperature is reduced to 150° F. The remainder of the liquid then progresses to the first effect of the device where it is further evaporated and reduced in temperature to 110° F. The evaporated liquid at 110° F. is discharged through the pump 119. The steam added through the pipe 82 is only required in sufficient amounts to make up the differences in temperatures in chamber 111 and in pipe 118 and to compensate for efficiency losses. This is equal to about 60° F.

The device of Figure 3 provides an evaporator equivalent to a multi-effect evaporator with one and one-half effects in it. However, in this device, no boiling of the liquid to be evaporated takes place across any metal surface. All surface heat transfer is taken care of in the counterflow heat exchanger where the heated liquid temperature is below the vapor pressure in the unit. Therefore boiling does not exist.

In all the embodiments of the present invention, the liquid being heated is never exposed to a heating fluid which is materially above the temperature desired for the liquid. Therefore, scorching of heat-sensitive liquids cannot occur. In addition, the heating is effected in successive stages at increased pressures and utilizes heat from the liquid in the succeeding stages for heating the preceding stages. The liquid to be sterilized or evaporated is thus brought gradually up to the desired temperature and then gradually cooled to an outlet temperature intermediate the inlet temperature and the desired temperature. The only external heat needed is that for operating the last effect or stage of the device.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a heating device a tank defining a heating chamber, said tank having a perforated top wall, an open-topped container extending through the bottom wall of the tank into spaced relation from the perforated top wall thereof and having a side wall spaced inwardly from the side wall of the tank to cooperate therewith in defining an annular space between the walls, a cap on the perforated top wall of the tank defining a feed chamber above the perforations in said top wall for feeding liquid in spray form into the heating chamber above the open top of the container, and means for injecting heating fluid into the space between the side walls of the container and tank.

2. In a heating device a tank defining a heating chamber, said tank having a perforated top wall, an insert container projecting through the bottom wall of the tank and having an open top spaced below the perforations in the top wall of the tank, said insert container and said tank cooperating to define an annular passageway in the heating chamber, an upstanding neck member on the perforated top wall of the tank projecting into the feed chamber to define an overflow passageway from the feed chamber into the top of the heating chamber, said perforations in the top wall of the tank and said overflow passageway being positioned above the open top of the container to deposit liquid by gravity first through the upper portion of the heating chamber and then into the interior of the container, and means for injecting heating fluid into the annular space in said tank at a level materially below the open top of the insert container.

JOHN F. CREWS.

REFERENCES CITED

The following references are of record in the file of this patent:

UNITED STATES PATENTS

| Number | Name | Date |
| --- | --- | --- |
| 780,612 | Meyer | Jan. 24, 1905 |
| 1,040,875 | Burhorn | Oct. 8, 1912 |
| 1,547,063 | Ray et al. | Aug. 4, 1925 |
| 1,799,478 | Peebles | Apr. 7, 1931 |

FOREIGN PATENTS

| Number | Country | Date |
| --- | --- | --- |
| 63,200 | Germany | July 11, 1892 |